United States Patent [19]

Beihoff

[11] Patent Number: 4,852,411

[45] Date of Patent: Aug. 1, 1989

[54] TORQUE SENSOR

[75] Inventor: Bruce C. Beihoff, Wauwatosa, Wis.

[73] Assignee: Eaton Corporation, Cleveland, Ohio

[21] Appl. No.: 288,081

[22] Filed: Dec. 21, 1988

[51] Int. Cl.$^4$ .................................................. G01L 3/10
[52] U.S. Cl. ................................ 73/862.36; 73/862.33; 324/209
[58] Field of Search .................... 73/862.36, 862.33; 324/209; 336/20

[56] References Cited

U.S. PATENT DOCUMENTS

| | | |
|---|---|---|
| 2,511,178 | 6/1950 | Roters . |
| 2,521,905 | 9/1950 | Feller . |
| 2,548,397 | 4/1951 | Schaevitz .............................. 324/209 |
| 2,557,393 | 6/1951 | Rifenbergh . |
| 2,895,331 | 7/1959 | Dahle . |
| 3,026,491 | 3/1962 | Dubsky et al. . |
| 4,232,922 | 11/1980 | Teass, Jr. . |
| 4,279,163 | 7/1981 | Takekoshi et al. . |
| 4,414,855 | 11/1983 | Iwasaki .............................. 73/862.36 |
| 4,416,161 | 11/1983 | Barkhoudarian . |
| 4,506,554 | 3/1985 | Blomkvist et al. . |
| 4,523,482 | 6/1985 | Barkhoudarian . |
| 4,563,905 | 1/1986 | Himmelstein . |
| 4,566,338 | 1/1986 | Fleming et al. . |
| 4,572,005 | 2/1986 | Kita . |
| 4,598,595 | 7/1986 | Vranish et al. . |
| 4,616,512 | 10/1986 | Himmelstein et al. . |
| 4,631,796 | 12/1986 | Inomata et al. . |
| 4,712,432 | 12/1987 | Hochstein et al. . |
| 4,712,433 | 12/1987 | Hochstein et al. . |
| 4,727,757 | 3/1988 | Hilzinger et al. . |
| 4,754,652 | 7/1988 | Coulter et al. . |
| 4,769,599 | 9/1988 | Mermelstein . |

FOREIGN PATENT DOCUMENTS 51840 4/1985 U.S.S.R. .......................... 73/862.36

Primary Examiner—Joseph A. Orsino
Assistant Examiner—Hollis T. Chen
Attorney, Agent, or Firm—Andrus, Sceales, Starke & Sawall

[57] ABSTRACT

A torque sensor for a cylindrical shaft subject to torque employs an electrically conductive loop on the shaft, which loop exhibits changing electrical impedance with changing stress and strain as the shaft is torqued. In another embodiment, a pair of loops exhibit oppositely changing electrical impedance as the shaft is torqued. In another embodiment, a magneto-elastic electrically conductive loop on the shaft exhibits changing magnetic permeability and changing electrical impedance with changing stress and strain as the shaft is torqued. In another embodiment, a pair of magneto-elastic electrically conductive loops on the shaft each have accordion-like corrugations and the loops exhibit oppositely changing magnetic permeabilities and oppositely changing electrical impedances with changing stress and strain as the shaft is torqued, wherein the corrugations of one loop stretch while the corrugations of the other loop contrast in response to one direction of shaft torque, and vice versa for the other direction of shaft torque. In another embodiment, magneto-elastic strips are placed on electrically conducting strips on the shaft. In another embodiment, magneto-elastic strips on the shaft are circumscribed by electrically conductive loops on the shaft.

9 Claims, 2 Drawing Sheets

TORQUE SENSOR

BACKGROUND AND SUMMARY

The invention relates to torque sensors for cylindrical shafts subject to torque.

Torque sensors are known in the art, including magnet-elastic torque sensors, for example as shown in Garshelis U.S. Pat. Nos. 4,760,745 and Hochstein et al 4,712,432 and 4,712,433. In these types of sensors, magneto-elastic material on the shaft exhibits changing magnetic permeability with changing stress and strain as the shaft is torqued. The changing permeability is sensed, and is indicative of torque.

The present invention provides an improved magneto-elastic torque sensor incorporating both electrical and magnetic properties to provide improved signal strength and larger differential signals between stressed and strained conditions as the shaft is torqued.

The invention also relates to a torque sensor relying upon electrical properties of a conductive loop on a shaft subject to torque.

DETAILED DESCRIPTION

Prior Art

Figure 1:
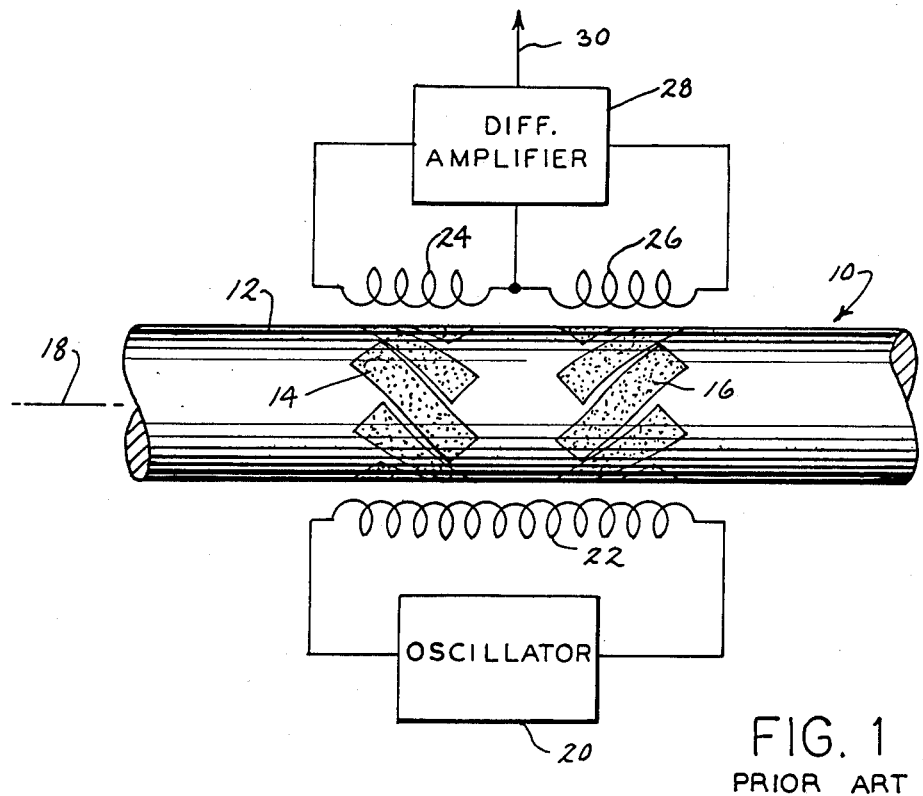
FIG. 1 shows a magneto-elastic torque sensor known in the prior art.

FIG. 1 shows a magneto-elastic torque sensor known in the prior art, for which further reference may be had to the above noted Garshelis and Hochstein et al patents, incorporated herein by reference. Torque sensor 10 includes an axially extending cylindrical shaft 12 subject to torque, a first set of magneto-elastic strips 14 on the shaft, and a second set of magneto-elastic strips 16 on the shaft. The strips extend diagonally at a 45° angle relative to axis 18 of the shaft and oppositely to each other, such that the strips exhibit oppositely changing magnetic permeabilities with changing stress and strain as the shaft is torqued. Oscillator 20 drives exciter coil 22 which induces magnetic flux in strips 14 and 16, which flux is sensed by sensor coils 24 and 26. Due to the oppositely changing permeabilities of strips 14 and 16, coil 24 will exhibit a positive going signal while coil 26 exhibits a negative going signal, or vise versa, which signals are sensed and amplified by differential amplifier 28 to provide an output signal at 30 indicative or torque on shaft 12. The two sets of oppositely oriented strips 14 and 16 effectively double the available signal otherwise available from only a single set of strips, i.e. the difference between the positive signal from coil 24 and the negative signal from coil 26 is twice the variance available from a single set of like oriented strips.

Present Invention

Figure 2:
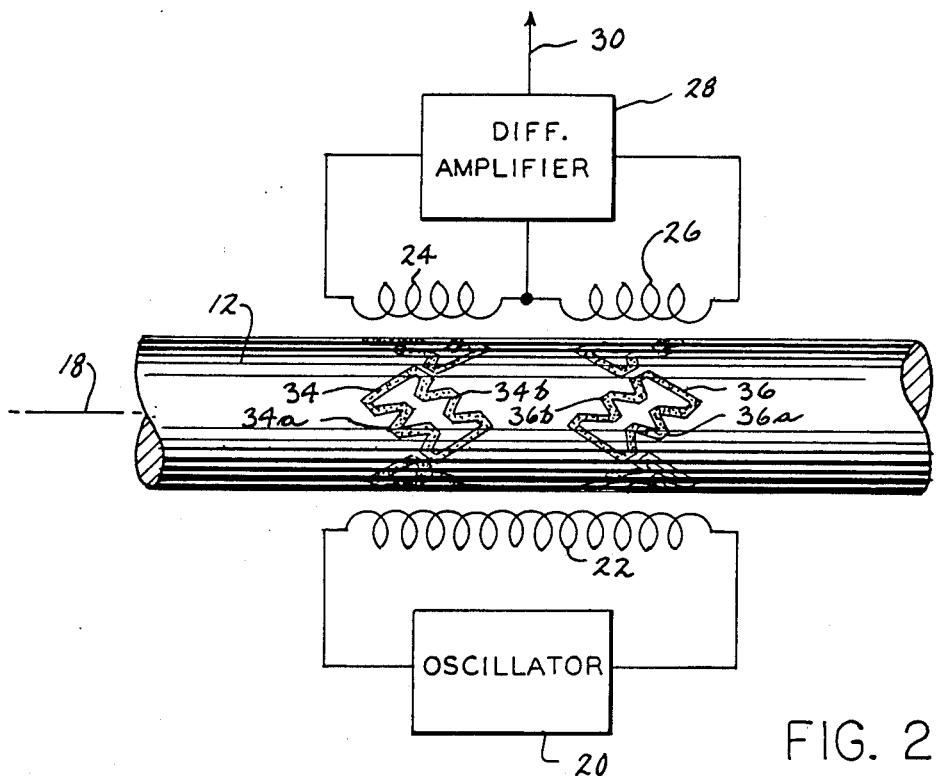
FIG. 2 shows a torque sensor in accordance with the invention.

In the present invention, strips 14 are replaced by a first set of one or more magneto-elastic electrically conductive loops 34 on shaft 12, FIG. 2, and strips 16 are replaced by a set of one or more magneto-elastic electrically conductive loops 36 on shaft 12. Loops 34 nd 36 are printed, deposited, electroplated, metal sprayed, or otherwise formed on shaft 12. Loops 34 and 36 are NiCo, NiFe, TbFe, PyFe, NiMnFe, or other magneto-elastic materials. Loop 34 has accordion-like corrugations 34a and 34b, and loop 36 has accordion-like corrugations 36a and 36b. Loops 34 and 36 extend diagonally relative to axis 18 of shaft 12 and oppositely to each other. The loops exhibit oppositely changing magnetic permeabilities with changing stress and strain as the shaft is torqued. The loops exhibit oppositely changing electrical impedances with changing stress and strain as the shaft is torqued. As shaft 12 is torqued clockwise as viewed from the left, corrugations 34a and 34b stretch and increase electrical impedance of loop 34, while corrugations 36a and 36b contract and decrease electrical impedance of loop 36. When shaft 12 is torqued in the other direction, counterclockwise as viewed from the left, corrugations 34a and 34b contract and decrease electrical impedance of loop 34, and corrugations 36a and 36b stretch and increase electrical impedance of loop 36.

The excitation and sensing circuitry in FIG. 2 is the same as that in FIG. 1. Excitation oscillator coil 22 induces magnetic flux in magneto-elastic members 34 and 36. Coil 22 also induces electric current in members 34 and 36, because they are electrically conductive loops, as a function of magnetic flux change, according to standard transformer principles. Coils 24 and 26 sense the magnetic flux in members 34 and 36, respectively. Coils 24 and 26 also sense electric current in respective loops 34 and 36 as a function of magnetic flux change, according to standard transformer principles.

In operation, as shaft 12 is torqued in one direction, the corrugations of one of the loops are stretched and the corrugations of the other loop are contracted, such that the electrical impedance of one loop increases and the electrical impedance of the other loop decreases, and the magnetic permeability of the one loop decreases and the magnetic permeability of the other loop increases, such that there is less current and less flux in the one loop, and more current and more flux in the other loop, which in turn further increases the differential between the signals from coils 24 and 26.

The invention also contemplates the use of the electrical properties noted above regarding an electrically conductive loop on the shaft. The combination with the magnetic properties, particularly magneto-elastic material, is preferred for improved signal strength.

Figure 3:
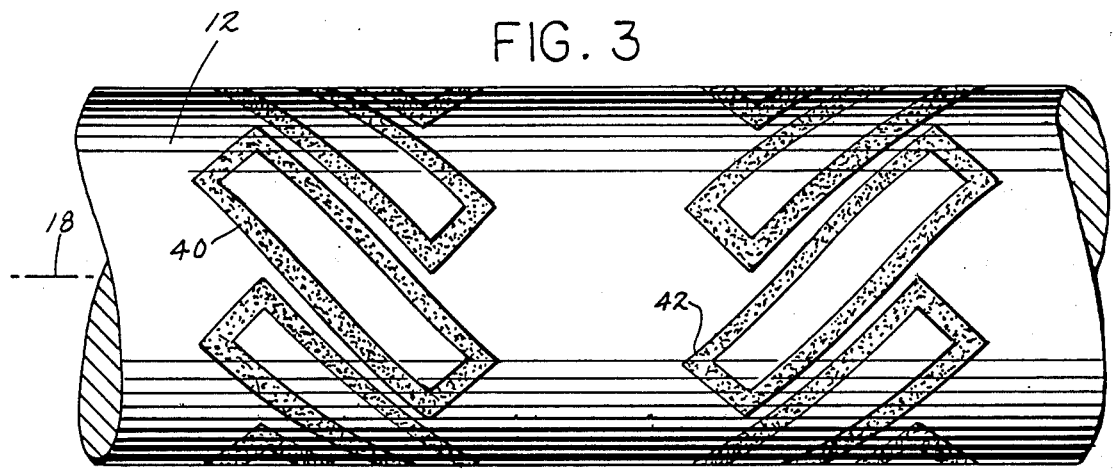
FIG. 3 shows an alternate embodiment of the invention.

FIG. 3 shows an alternate embodiment of the invention and uses like reference numerals from the above figures where appropriate to facilitate clarity. FIG. 3 shows a plurality of pairs of magneto-elastic electrically conductive loops such as 40 and 42 on shaft 12 similar to loops 34 and 36 but without the corrugations. Loops 40 and 42 are oriented diagonally to axis 18 of shaft 12 and oppositely to each other such that the loops exhibit oppositely changing electrical impedances with changing stress and strain as the shaft is torqued. Loops 40 and 42 are printed, deposited, electroplated, metal sprayed, or otherwise formed on shaft 12. The excitation and sensing circuitry is the same as that in FIG. 2.

Figure 4:
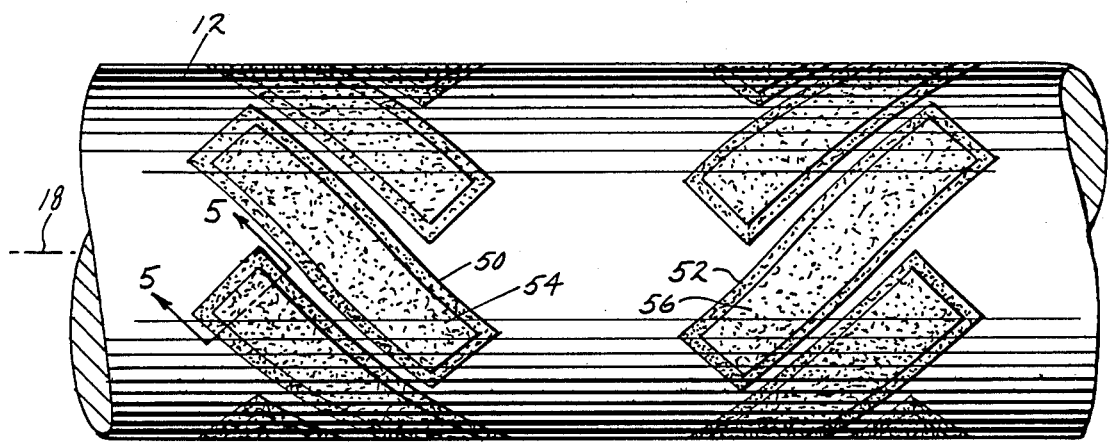
FIG. 4 shows another alternate embodiment of the invention.
Figure 5:
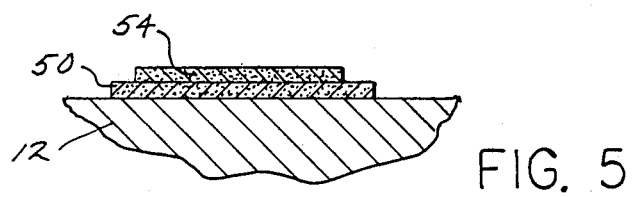
FIG. 5 is a sectional view taken along line 5—5 of FIG. 4.

FIGS. 4 and 5 show another alternate embodiment and use like reference numerals from the above figures where appropriate to facilitate clarity. A plurality of pairs of electrically conductive strips such as 50 and 52 on shaft 12 are oriented diagonally to axis 18 of the shaft and oppositely to each other such that the strips exhibit oppositely changing electrical impedances with changing stress and strain as the shaft is torqued. A plurality of pairs of magneto-elastic strips such as 54 and 56 are on respective of the electrically conductive strips, FIG. 5, and oriented diagonally to axis 18 of shaft 12 and oppositely to each other such that the magneto-elastic strips exhibit oppositely changing magnetic permeabilities with changing stress and strain as the shaft is torqued. Strips 50 and 52 are printed, deposited or electroplated on shaft 12. Strips 54 and 56 are printed, deposited, electroplated, metal sprayed, or otherwise formed on respective strips 50 and 52. The excitation and sensing circuitry is the same as that in FIG. 2.

Figure 6:
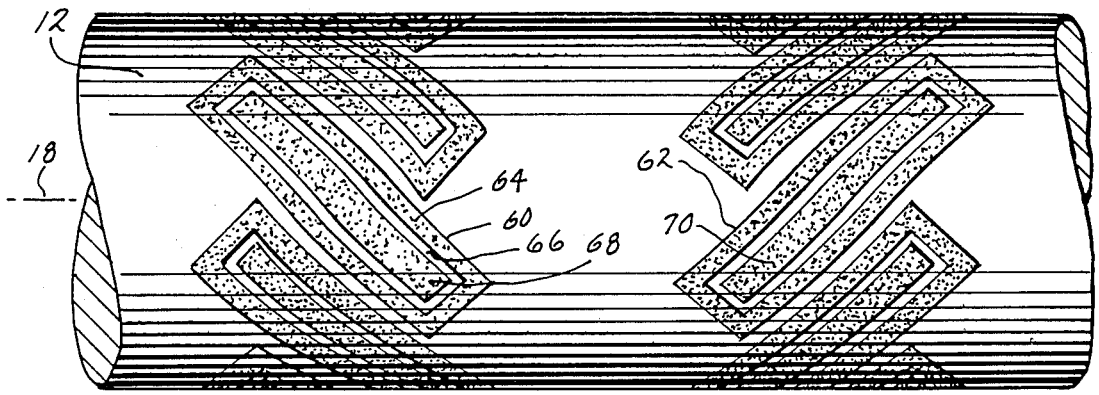
FIG. 6 shows another alternate embodiment of the invention.

FIG. 6 shows another alternate embodiment and uses like reference numerals from the above figures where appropriate to facilitate clarity. A plurality of pairs of electrically conductive loops such as 60 and 62 on shaft 12 are oriented diagonally to axis 18 of the shaft and oppositely to each other such that the loops exhibit oppositely changing electrical impedances with changing stress and strain as the shaft is torqued. Each loop has an outer perimeter 64 around a central open portion 66. A plurality of pairs of magneto-elastic strips such as 68 and 70 are provided on shaft 12 and extending diagonally relative to axis 18 of the shaft and oppositely to each other such that the strips exhibit oppositely changing magnetic permeabilities with changing stress and strain as the shaft is torqued. Each strip is disposed on shaft 12 in the central open portion of its respective conductive loop and circumscribed thereby, for example as shown at strip 68 in central open portion 66 of loop 60 and circumscribed by perimeter 64 of the loop. The loops such as 60 and 62 and the strips such as 68 and 70 are printed, deposited, electroplated, metal sprayed, or otherwise formed on shaft 12. The excitation and sensing circuitry is the same as that in FIG. 2.

It is recognized that various equivalents, alternatives and modifications are possible within the scope of the appended claims.

I claim:

1. A torque sensor comprising:
a cylindrical shaft subject to torque;
an electrically conductive loop on said shaft exhibiting changing electrical impedance with changing stress and strain as said shaft is torqued;
means for inducing electric current in said loop;
means for sensing electric current in said loop.

2. A torque sensor comprising:
an axially extending cylindrical shaft subject to torque;
a pair of electrically conductive loops on said shaft oriented diagonally to the axis of said shaft and oppositely to each other, such that one of said loops exhibits increasing electrical impedance and the other of said loops exhibits decreasing electrical impedance as said shaft is torqued in one direction, and such that said one loop exhibits decreasing electrical impedance and said other loop exhibits increasing electrical impedance as said shaft is torqued in another direction, such that said loops exhibit oppositely changing electrical impedances as said shaft is torqued;
means for inducing electric current in said loops;
means for sensing electric current in said loops.

3. A torque sensor comprising:
a cylindrical shaft subject to torque;
a magneto-elastic electrically conductive loop on said shaft exhibiting changing magnetic permeability with changing stress and strain as said shaft is torqued and exhibiting changing electrical impedance with changing stress and strain as said shaft is torqued;
means for inducing magnetic flux and electric current in said loop;
means for sensing magnetic flux and electric current in said loop.

4. The invention according to claim 3 wherein:
in response to one direction of shaft torque, magnetic permeability of said loop decreases and electrical impedance of said loop increases to reduce magnetic flux and electric current in said loop;
in response to shaft torque in the other direction, magnetic permeability of said loop increases and electrical impedance of said loop decreases, to increase magnetic flux and electric current in said loop.

5. A torque sensor comprising:
an axially extending cylindrical shaft subject to torque;
a pair of magneto-elastic electrically conductive loops on said shaft each having accordion-like corrugations and extending diagonally relative to the axis of said shaft and oppositely to each other, said loops exhibiting oppositely changing magnetic permeabilities with changing stress and strain as said shaft is torqued, said loops exhibiting oppositely changing electrical impedances with changing stress and strain as said shaft is torqued, the corrugations of one of said loops stretching while the corrugations of the other of said loops contract in response to one direction of shaft torque, and the corrugations of said one loop contracting while the corrugations of said other loop stretch in response to the opposite direction of shaft torque;
means for inducing magnetic flux and electric current in said loops;
means for sensing magnetic flux and electric current in said loops.

6. A torque sensor comprising:
an axially extending cylindrical shaft subject to torque;
an electrically conductive strip on said shaft exhibiting changing electrical impedance with changing stress and strain as said shaft is torqued;
a magneto-elastic strip on said electrically conductive strip and exhibiting changing magnetic permeability with changing stress and strain as said shaft is torqued;
means for inducing electric current and magnetic flux in respective said strips;
means for sensing electric current and magnetic flux in respective said strips.

7. The invention according to claim 6 comprising a plurality of said electrically conductive strips on said shaft oriented diagonally to the axis of said shaft and oppositely to each other such that said electrically conductive strips exhibit oppositely changing electrical impedances as said shaft is torqued, and comprising a plurality of said magneto-elastic strips on respective said electrically conductive strips and oriented diagonally to the axis of said shaft and oppositely to each other such that said magneto-elastic strips exhibit oppositely changing magnetic permeabilities with changing stress and strain as said shaft is torqued.

8. A torque sensor comprising:
- an axially extending cylindrical shaft subject to torque;
- an electrically conductive loop on said shaft exhibiting changing electrical impedance with changing stress and strain as said shaft is torqued, said loop having a perimeter around an open central portion;
- a magneto-elastic strip on said shaft in said open central portion of said loop and circumscribed by said perimeter of said loop, said magneto-elastic strip exhibiting changing magnetic permeability with changing stress and strain as said shaft is torqued;
- means for inducing electric current in said loop and magnetic flux in said strip;
- means for sensing electric current in said loop and magnetic flux in said strip.

9. The invention according to claim 8 comprising a plurality of said electrically conductive loops on said shaft oriented diagonally to the axis of said shaft and oppositely to each other such that said loops exhibit oppositely changing electrical impedances with changing stress and strain as said shaft is torqued, and comprising a plurality of said magneto-elastic strips on said shaft circumscribed by respective said electrically conductive loops and oriented diagonally to the axis of said shaft and oppositely to each other such that said strips exhibit oppositely changing magnetic permeabilities with changing stress and strain as said shaft is torqued.

* * * * *